US010791438B1

(12) United States Patent
Edwards et al.

(10) Patent No.: US 10,791,438 B1
(45) Date of Patent: Sep. 29, 2020

(54) EQUIPMENT ANALYSIS FOR MOBILE ASSETS

(71) Applicant: KCF TECHNOLOGIES, INC., State College, PA (US)

(72) Inventors: Mark Edwards, State College, PA (US); Lucas Stine, State College, PA (US); Blake Bonfanti, State College, PA (US); Jacob Loverich, State College, PA (US)

(73) Assignee: KCF TECHNOLOGIES, INC., State College, PA (US)

( * ) Notice: Subject to any disclaimer, the term of this patent is extended or adjusted under 35 U.S.C. 154(b) by 0 days.

(21) Appl. No.: 16/406,829

(22) Filed: May 8, 2019

(51) Int. Cl.
| | |
|---|---|
| *G08G 1/123* | (2006.01) |
| *H04W 4/44* | (2018.01) |
| *H04W 4/38* | (2018.01) |
| *G07C 5/00* | (2006.01) |
| *H04W 4/35* | (2018.01) |
| *B60P 3/22* | (2006.01) |

(52) U.S. Cl.
CPC .............. *H04W 4/44* (2018.02); *G07C 5/008* (2013.01); *H04W 4/35* (2018.02); *H04W 4/38* (2018.02); *B60P 3/228* (2013.01)

(58) Field of Classification Search
CPC ........... H04W 4/44; H04W 4/35; H04W 4/38; G07C 5/008; B60P 3/228
USPC ......................................................... 340/993
See application file for complete search history.

(56) References Cited

U.S. PATENT DOCUMENTS

| | | | | |
|---|---|---|---|---|
| 2005/0085973 | A1* | 4/2005 | Furem | E02F 9/2054 701/50 |
| 2006/0212203 | A1* | 9/2006 | Furuno | E02F 9/2242 701/50 |
| 2019/0246344 | A1* | 8/2019 | Prasad | H04W 12/003 |

* cited by examiner

*Primary Examiner* — Tanmay K Shah
(74) *Attorney, Agent, or Firm* — W&C IP

(57) ABSTRACT

A system having a variety of mobile assets to which are attached one or more wireless sensors and associated with each mobile asset to automate enterprise software organization of assets among dynamically changing sites. A plurality of receivers receive data from redundant wireless sensors, and at least one gateway aggregates wireless sensor data from the receivers, the wireless sensors, receivers and gateway forming a local network associated with a given site. At least one server hosting enterprise software receives aggregated data from the at least one gateway. The enterprise software identifies the location of an asset based on association of a local network with a site and association of sensors with an asset.

12 Claims, 10 Drawing Sheets

EQUIPMENT ANALYSIS FOR MOBILE ASSETS

BACKGROUND OF THE INVENTION

Field of the Invention

The present invention generally relates to automated software data organization based on physical sensor data routing over a low power wireless network and, more particularly, the invention uses connectivity status of redundant wireless sensors to a local area network (LAN) in addition to predefined associations of sensors to assets and wireless receivers to sites to automate enterprise software organization of assets among dynamically changing sites.

Background Description

Industrial asset and process enterprise software generally offer a User Interface (UI) for plant reliability, operators, and maintenance personnel to draw conclusions from asset data and improve the industrial production quality and yield, reduce cost, or manage logistical functions like scheduling maintenance and ordering spare parts. For example, by knowing the health of machines in real-time, they can be repaired at times that maximize machine productivity and minimize cost associated with catastrophic machine failure.

In this context, Machine Learning (ML) and Automated Intelligence (AI) is used to estimate the expected current state or future state of assets and processes. Differences between the actual state and predicted state can be used to detect problems that may need attention, or AI models can be used to forecast asset failures, future cost, or productivity, etc. These AI models are generally data-driven meaning they leverage historical data to train algorithms and in some cases real-time data to operate. In such cases, the relationship between sensor datasets recorded at a given site and their relationship to a given asset is essential. An example of this is the relationship between operational parameters like pump flow rate and pressure head, which are typically part of a permanent wired Distributed Control System (DCS), and new wireless Industrial Internet of Things (IIoT) sensors like machine health or vibration sensors. In this case, to model the impact that cavitation has on a pump's remaining useful life, the pump speed, flow rate, and vibration measurements must all be aggregated for a single asset class. Other metrics like valve position and upstream feed pump are also useful for building such models because they can offer possibilities for controllable or actionable outcomes of AI models to practically change the trajectory of the pump degradation. Further, it is important to know which pumps are adjacent to one another for diagnosing problems such as fluid born resonance. Training such AI models using Big Data Analysis techniques at an enterprise software level requires the analysis of data from many pumps that could be at different site locations and with different dataset associations. AI applications that run persistently using real-time sensor data especially require up to date data associations that follow the physical site.

The organization of the data in an enterprise software solution is often used to define the associations between datasets like pump vibration measured on the pump and outlet pressure, which may be measured in a downstream manifold. Organization often simply means the directory structure for the data. The enterprise software is often organized using hierarchies or directory structures. In the case of industrial asset management or health management enterprise software, locations, sites, or facilities are typically broken down into subsystems and assets where data such as process variables, machine health data, or engineering design data is stored, monitored, and analyzed. The organization is usually a virtual organization or associations are defined by metadata rather than a physical partitioning of data storage memory. Associations are typically built explicitly or implicitly-based on a data hierarchy that may match the physical configuration of assets at a site.

In most industrial assets like paper plants, steel mills, or automotive assembly plants, the organization or structure into which the data flows is fixed or static and setup upon commissioning of an account. However, in certain mobile fleet applications such as mining, transportation, construction, or more specifically hydraulic fracturing well completion, groups of assets are distributed across several job sites or regions. The assets at a given site changes from week to week with certain assets moving to a depot for maintenance and others to other job sites during a given job cycle. In this case, datasets for mobile fleets are interrelated differently based on what assets are present at a given site at a particular time. Manually managing the organization of these directory structures or dataset association is a software configuration and maintenance challenge. This is particularly evident when assets are replaced, reorganized, added, or removed in the middle of a job taking place at a site which may last for weeks or months.

In mobile fleets, automating the organization and interrelationships of assets in an enterprise software and their sensor data feeds has conventionally been done using Global Positioning System (GPS) reference data, where asset software instance's associations are defined based on a GPS location measurement taken at sensors on the asset. The sensor data corresponding to the GPS reading then follows a deterministic trajectory into a data directory folder that may have predetermined associations with a GPS site location. This type of organization strategy is facilitated by traditional sensor infrastructure where sensors are hardwired to an asset's communication and power network. In this case, data from the sensors is aggregated at a local gateway or server on the asset using a local wired network like a Controller Area Network (CAN) bus and then sent via a single conduit like an ethernet backbone, cellular or satellite network from the asset to a site server, and then to cloud hosted enterprise software. The data is routed to a remote database where the enterprise software system logs the data from that specific asset in its assigned directory folder. A GPS location for the asset is shared across all the sensor feeds.

Such conventional wired sensor infrastructure is being displaced in many applications, especially mobile fleet applications, by lower cost, easier to use, and more capable IIoT sensors. From a practical and economic standpoint these new IIoT devices must be networked to each other, the Internet, and the existing industrial infrastructure using wireless communication. Low power wireless sensors can now be deployed at orders of magnitude lower cost than traditional wired sensors. Because the wireless sensor devices are typically battery or energy harvester powered, most wireless IIoT sensors are resource constrained in terms of their energy budget and wireless bandwidth usage.

In a typical IIoT application, sensors on machines wirelessly send data to a gateway or data aggregator using a low power wireless Local Area Network (LAN). A central local (on-premise) or cloud hosted computer or server connected to the wireless gateway consumes the data and offers monitoring, analysis, modeling, and predictive or prescriptive reporting. Receivers or data gateways automatically allow trusted or white listed sensors to connect and join the LAN. The sensors often communicate to one or more receivers on the site rather than to receivers on each asset. Similarly, data from all the assets is routed over a single satellite or cellular connection rather than one for each asset, which saves data transmission cost and receiver infrastructure cost. The sensor's association with an asset are no longer defined by a wired connection or network with the asset. Rather, the association of sensors to an asset must be assigned in another way, like in enterprise software using a sensor ID designation, IP (Internet Protocol) address, or serial number. In many cases the sensors are temporarily installed on assets using magnetic mounts, allowing them to be easily replaced if they are broken or moved out of the way for asset maintenance work. Owing to cost, GPS transponders are rarely included in industrial low power wireless sensors which negates that option to directly track each sensor's location. Further, if GPS transponders are included on an asset, they often are not connected to the wireless sensor solution or the enterprise software solution that consumes the wireless sensor data.

Further complicating the asset management structure, assets in transit from one location to another may lose connectivity and are considered offline for lengthy periods of time. They are also offline and unconnected if the asset is decommissioned or at a maintenance depot. In addition, many of the sites are in remote locations where they may be offline due to weather related connectivity issues like rain fade and lack of cellular connectivity. In this case, the asset may be operating and at a particular site location but appear in the software to be in transit to another site.

SUMMARY OF THE INVENTION

This invention specifically addresses the challenge presented by the use of wireless IIoT sensors in enterprise software based on 1) lack of GPS at the individual sensor nodes and in many cases the asset, 2) the temporary nature of association of sensors to assets, 3) movement of assets from site to site, and 4) lack of hardwiring of sensors to network infrastructure. Existing technology and solutions do not address the complicated set of issues presented by use of wireless sensors for mobile fleet enterprise level AI. This invention offers a novel solution addressing these problems which is essential for enabling Big Data Analysis for mobile fleet application with wireless sensors.

The invention uses connectivity status of redundant wireless sensors to a local area network (LAN) in addition to predefined associations of sensors to assets and wireless receivers to sites to automate enterprise software organization of assets among dynamically changing sites. The invention enables Automated Intelligence (AI) equipment analysis for mobile assets and site dependent mobile asset management. The invention reduces the workload necessary to maintain a sensor network and enterprise software infrastructure. At the same time, the invention avoids inaccurate conclusions or actions based on an inaccurate software representation of the assets at physical sites. The invention helps users to proactively identify when sensors are misplaced or damaged.

This invention relates to Big Data Analysis, cloud enterprise software solutions, and field instrumentation including local sensor data networking. This invention offers a system for virtual software data organization and inter-associations of datasets that automatically updates to match changes to the actual physical location of assets and their instrumentation. The routing of data from instrumentation, mainly asset mounted wireless sensors, through a gateway is used to decipher the actual physical location of assets. This invention, in part, uses a gateway device and its association with a particular site location where the site is typically a physical location or area or facility. It can also be defined by a cohesive group of assets that are used to perform a common function and are located in near proximity to one another. A site could be a section of a mine or an oil well. In the case of hydraulic fracturing, the site is an area principally defined by a "data van" which hosts a gateway or receiver that communicate to all the sensors that are at the site Generally, sites have one GPS location that can be used to define where they reside. Assets in this case are typically a physical machine that performs a function as a part of a larger system that may be at a site. Examples include pumps, engines, fans, manifolds, or piping, etc. An asset may include a group of multiple components like a motor and centrifugal pump head may constitute a single asset. In the case of hydraulic fracturing, a pump truck may be treated as a single asset.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION THE INVENTION

Figure 1:
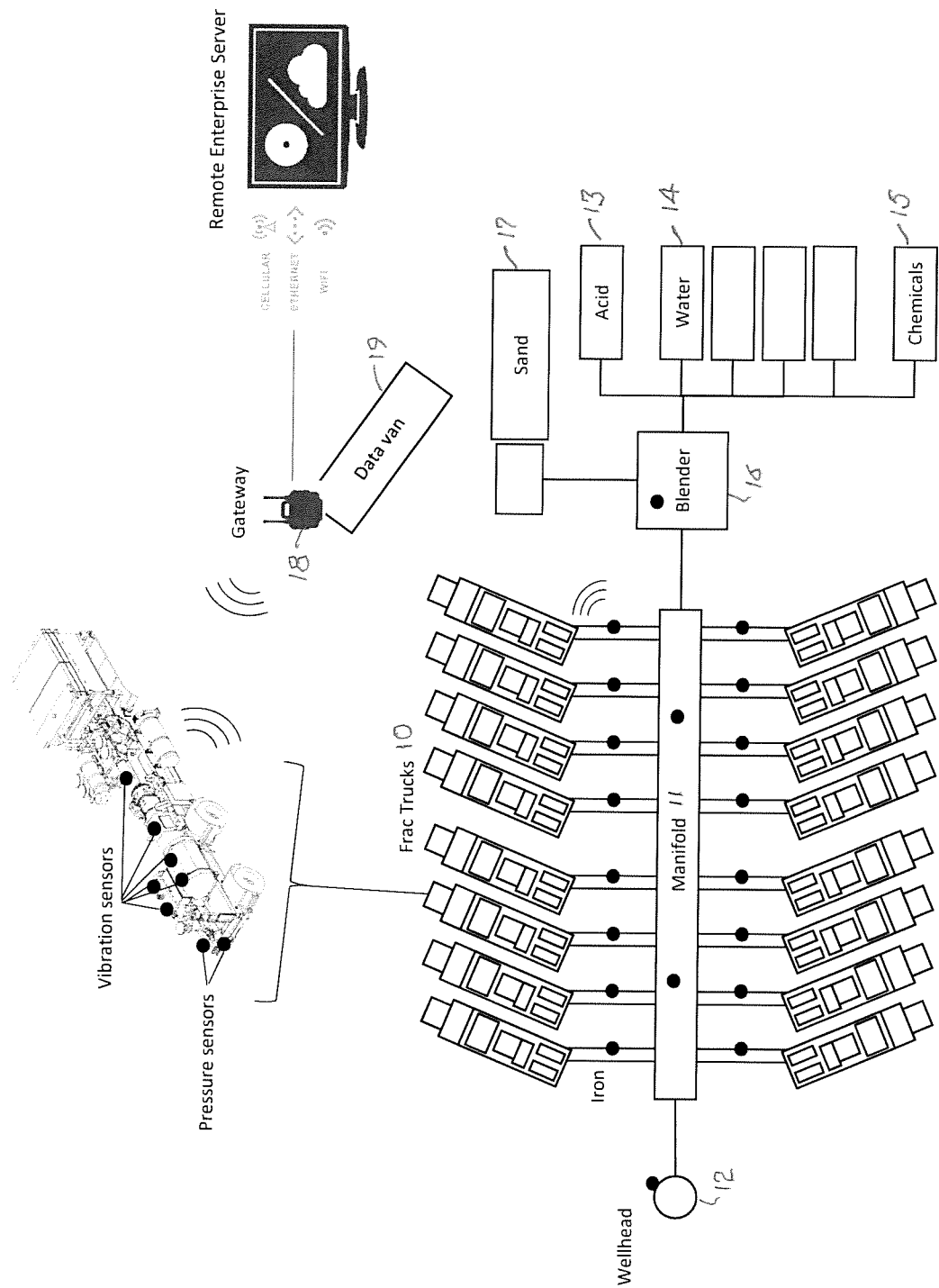
FIG. 1 shows a system diagram for a typical hydraulic fracturing site where the invention may be deployed.

The new technology that has necessitated this invention is low power wireless devices. These devices are typically fully autonomous and use batteries for power and wireless communication for data connectivity. In other words, the only connectivity of these devices to the network is via a wireless link. In some cases, they can use hardwired power rather than battery power. The sensors are usually in a sleep mode most of the time and only wake to collect and send data on a schedule or are triggered to wake by machine behavior. Therefore, the sensors are rarely in a persistent connection with a gateway or receiver. The sensors measure parameters like temperature, vibration, pressure, speed, flowrate, or oil quality.

The gateway aggregates data from one or more sensors at a site. In this way the gateway acts as a central data collection point that is typically connected to the Internet or intranet for delivering data to a database or repository. The gateway typically uses a low power and highly efficient wireless protocol such as BlueTooth, DARTwireless, Zigbee, or WirelessHART to communicate to sensors. But it may also use higher power protocols in certain cases like WiFi. The gateway keeps track of all the sensors or devices that are in communication with the gateway. In certain applications, several receivers make up the local network and are considered part of the same site network infrastructure forming a sort of supernet. Sensor nodes can move from one receiver to another and stay in the same network. The receivers can be repeaters in certain cases and relay aggregated data from one area of the site to another. The local network would typically use an ISM (Industrial, Scientific, and Medical radio band) band such as 900 MHZ, 2.4 GHz, or 5 GHz.

The data is routed from gateways to the Internet or intranet via either a wired Ethernet connection, satellite connection, or cellular connection. The data is then stored in the database that is part of the enterprise software solution. The database can be hosted in a third-party cloud server, a corporate cloud server, or server which may interface with gateways from one or more sites. The server or set of servers typically hosts databases for storing time series sensor data and metadata defining the sensor operation like sampling rates, asset definition, and other information that define the system. This may include asset characteristics like manufacturer, age, or operating envelope, etc.

The enterprise software solution may include multiple software components including databases, analytical computations, and user interfaces. For data analysis, viewing or other operations, the software is typically organized using a logical hierarchy. For example, directory folders or virtual instances for each site reside in a corporate account level folder. Asset's folders reside in site folders and so forth. In industrial applications, the hierarchy is used for managing data and keeping it organized. It forms a basis for then running analytical functions that may leverage certain aspects of the hierarchy or implied relationships between datasets. Often the hierarchy matches a physical arrangement of assets.

In this invention, gateways or other local network devices are associated with a given site. This association is done via GPS, other location finding like use of cellular networks, or direct association by a user in the software. This association is essential because data passing through the local network will be associated with that location. Another aspect of this invention is that the sensors, usually more than one, are assigned to an asset.

This invention identifies the location of an asset based on two features: association of a local network, mainly defined by the gateway, with a site, and association of sensors with an asset. In particular, when data arrives in the software, the above-mentioned associations are used to reorganize the enterprise software hierarchy, which essentially amounts to adding and removing virtual asset instances from some locations in the software.

FIG. 1 shows a system diagram for a typical hydraulic fracturing (frac) site where the invention may be deployed. In the illustrated system, a plurality of frac trucks 10 are connected by means of a manifold 11 to a wellhead 12. The flow of acid 13, water 14, and other chemicals 15 are fed to a blender 16 which mixes those components with sand 17, and the blended product is fed to the wellhead 12 transported by the manifold 11. The wireless sensors, shown as black dots, measure the health or process condition of the assets on the site. The assets include various components on the frac trucks, which may include the engine, transmission, power end (crack shaft and gear reducer), fluid end (manifold and valves), and iron (piping). Sensors may also measure other assets like the well head 12, valves, and the blender pump used to combine sand and water. A gateway 18 for communicating with the sensors is located in or on the data van 19. The gateway 18 may communicate with a local computer for displaying the health data or the control software. The gateway 18 also communicates to the enterprise software which is typically centrally located off-site or in the cloud.

Figure 2:
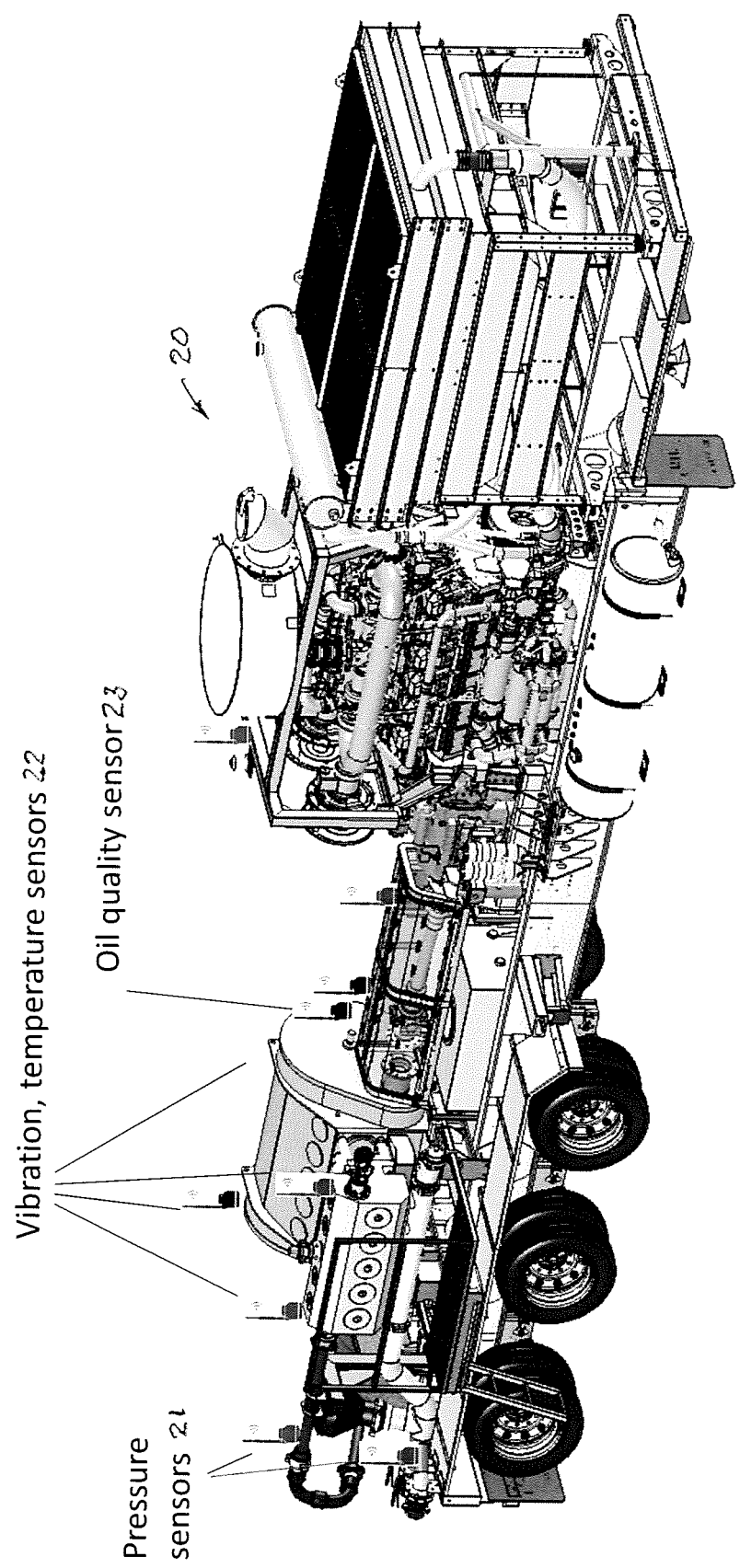
FIG. 2 shows the application of vibration, temperature, pressure, and oil quality sensors on a typical hydraulic fracturing pump truck.

FIG. 2 shows the application of vibration, temperature, pressure, and oil quality sensors on a hydraulic fracturing pump truck 20. These trucks are mobile assets that move from site to site. When they arrive at the site plumbing is added from the truck to the well head. Pressure sensors 21 measure dynamic inlet and outlet pressure on the iron or piping. When in operation, vibration and temperature sensors 22 measure the health of bearings, valves, and gears. Oil quality sensors 23 measures for contaminates in the oil like water that lead to premature degradation in the lubrication performance. Many of the assets on a frac truck like the fluid end are repaired in the field. This maintenance necessitates the use of wireless sensors, so wiring isn't disrupted or damaged while conducting maintenance tasks.

Figure 3:
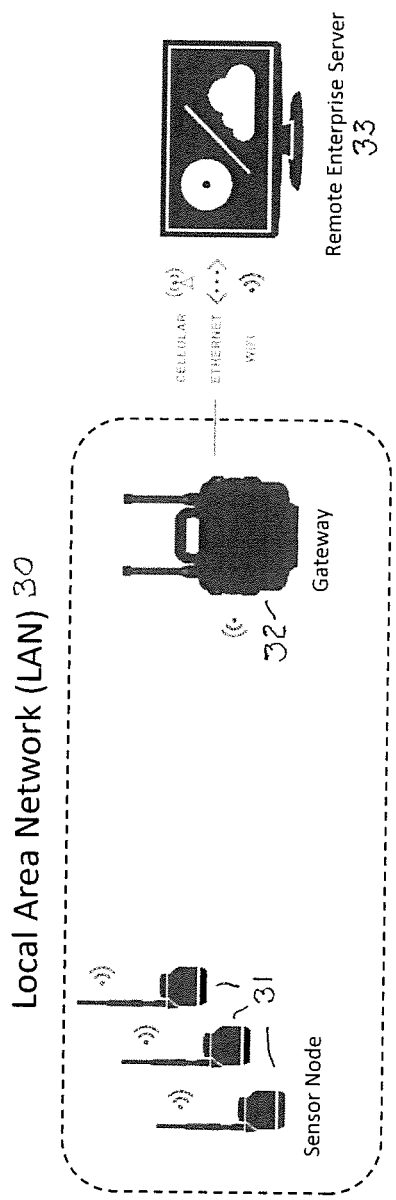
FIG. 3 shows a simplified version of the Local Area Network (LAN) that is fundamental to the infrastructure where the invention is typically applied.

FIG. 3 shows a simplified version of the Local Area Network (LAN) 30. The network is composed on sensors 31 and a gateway 32. The sensors 31 communicate wirelessly with a gateway 32. The gateways provide a means to locally manage the sensors, aggregate data, and communicate with the remote enterprise server 33.

Figure 4:
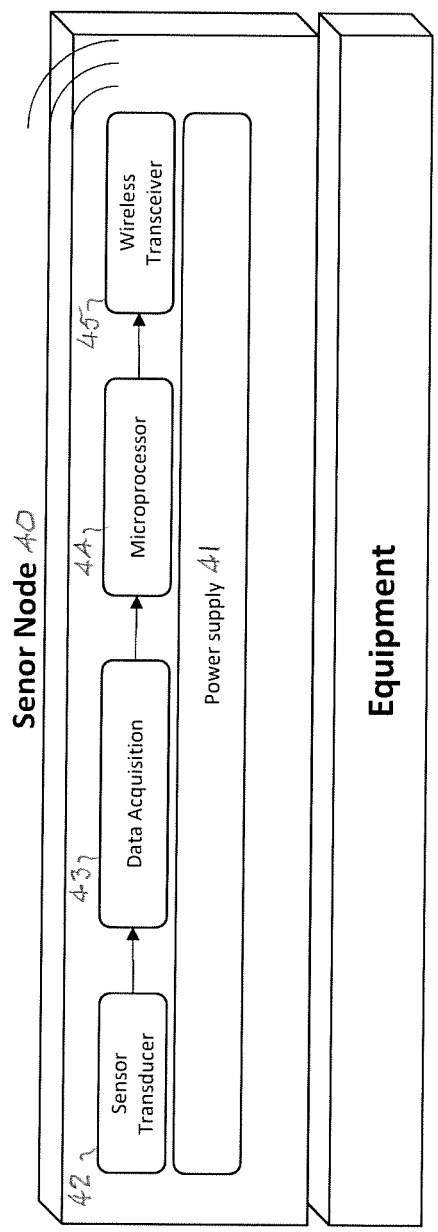
FIG. 4 shows block diagram of the sensor node.

FIG. 4 shows block diagram of the sensor node 40. The node is an essential component in the invention because it provides a key signal for organization of the assets in the software. However, they have very little intelligence owing to low power, cost, and size constraints. The node is composed of a power supply 41, sensor transducer 42, data acquisition module 43, microprocessor 44 functioning as a microcontroller, and wireless transceiver 45. The sensor transducer 42 is typically located internally to the vibration sensor but may be tethered to the node via a communication and power cable for sensors like pressure or oil quality. Transducers typically have an analog output which necessitate use of a data acquisition module 43 to digitize the measurement. The data is then sent from the data acquisition module to the wireless transceiver 45 for transmission over the wireless communication network. The microprocessor 44 controls all functional blocks in the sensor node 40. The power supply 41 is composed of a lithium-ion based battery and power conditioning circuit.

Figure 5:
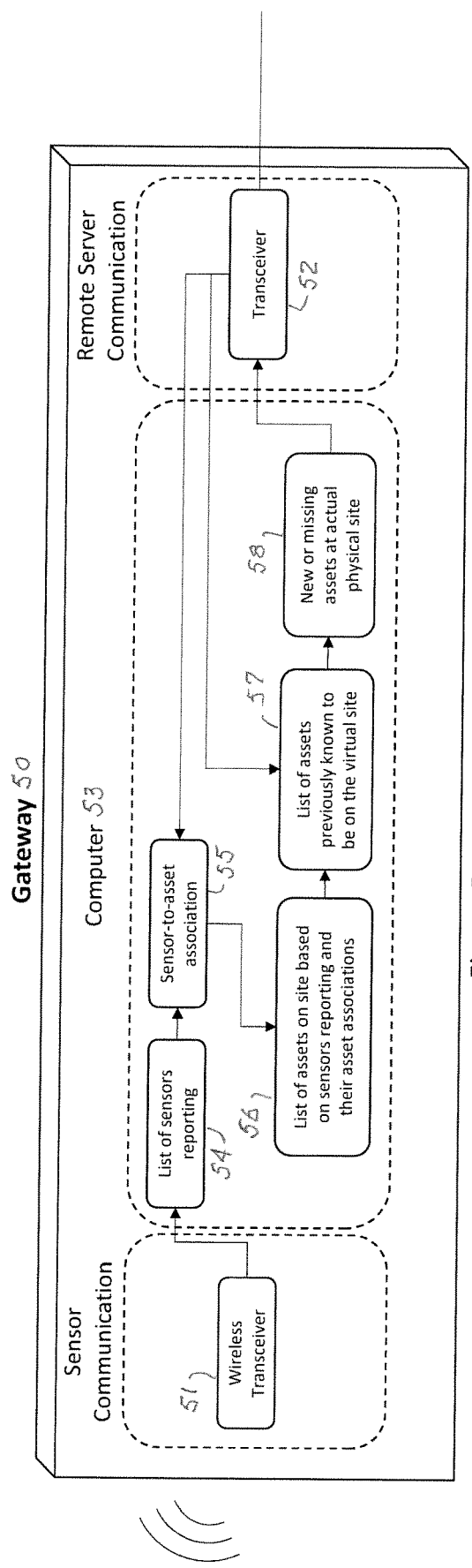
FIG. 5 shows block diagram of the gateway.

FIG. 5 shows block diagram of the gateway 50. The gateway is a central coordinator of the wireless network on the job site or facility and serves as a pass-through for the data from the sensors to the remote server. The gateway communicates with dozens or hundreds of sensor nodes via a wireless transceiver 51. The nodes are located on assets and logically assigned grouped as such in the remote server software. One or more gateways can be present on a site. The gateway 50 communicates with a remote server via a transceiver 52. At the heart of the gateway 50 is a computer 53 which manages the network. The computer 53 receives a list 54 of reporting sensors from transceiver 51 and a sensor-to-asset association 55 from the remote server via transceiver 52. The computer 53 generates a list 56 of assets on site based on sensors 54 reporting and their asset associations 55, and this list is compared with a list of assets previously known to be on the virtual site 57. This comparison produces an output of new or missing assets at the actual physical site 58 which is transmitted to the server via transceiver 52. In managing the wireless network on site, the gateway 50 keeps track of which assets are expected to be on site and compares that list to which assets are actually on site and reporting to the gateway. To do this the gateway receives a list of assets from the remote server that are expected to be on site based on the latest organization of assets in the software. Assets that are present but not on the list and assets that are not present but on the list are reported back to the remote server. This process is facilitated by using a list of sensors to asset associations that is configured at the remote server and sent to the gateway. These exchanges between the remote server and gateway provide the key information necessary to automatically organize assets in the remote server software.

Figure 6:
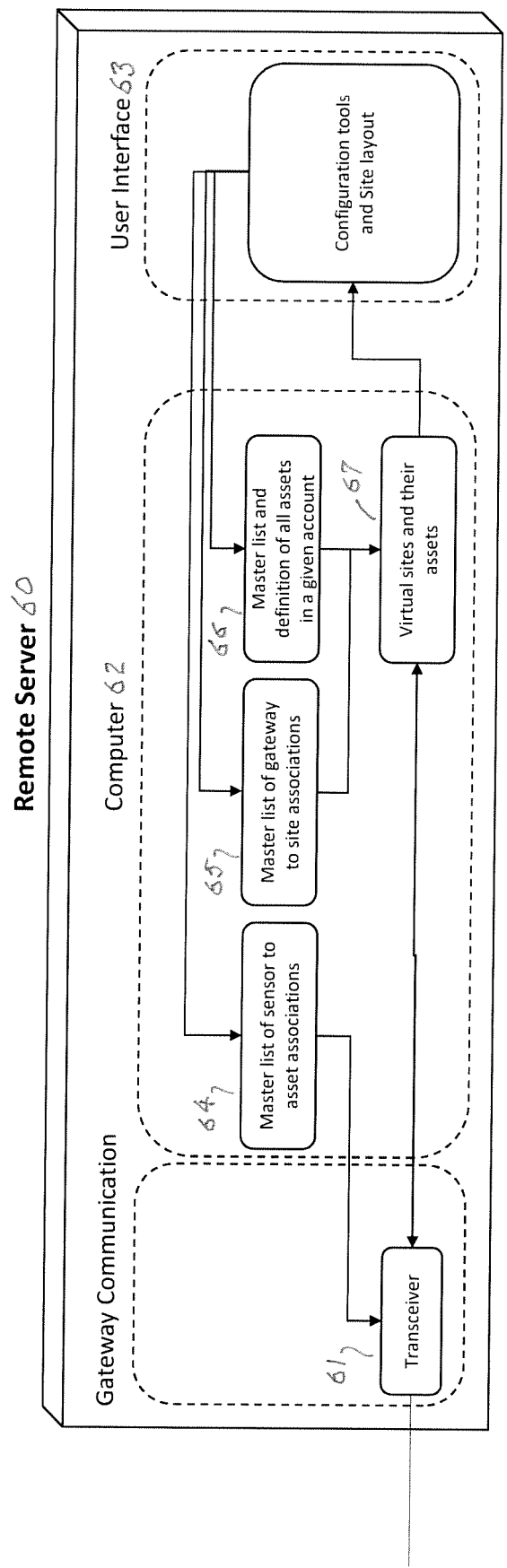
FIG. 6 shows block diagram of the remote server.

FIG. 6 shows block diagram of the remote server 60. The server communicates with one or more gateways via a transceiver 61. The remote server includes a computer 62 and a user interface (UI) 63. The computer 62 generates a master list of sensor to asset associations 64, a master list of gateway to site associations 65, and a master list and definition of all assets in a given account 66. Virtual sites and their assets 67 are generated from the master lists 65 and 66, and this information is communicated to the transceiver 61 and the UI 63. The UI 63 is the source of the data from which the master lists 64, 65 and 66 are generated. Many gateways may communicate to a given remote server. The user enters associations between the sensors and the assets via UI 63 based on the assets on which they were physically placed. The user also enters association of gateways to specific sites or facilities via the UI 63. The remote server 60 shares the list of sensors to asset associations with the gateways and a list of expected assets base on the last known organization of the site. Upon receiving the list of missing assets and unexpectedly present assets from the gateways, the remote server 60 reorganizes the software accordingly. Presence of one sensor is a sufficient condition to add an asset to the virtual site in the remote server. All sensors that are not present on a given asset are noted in the virtual site layout.

Figure 7:
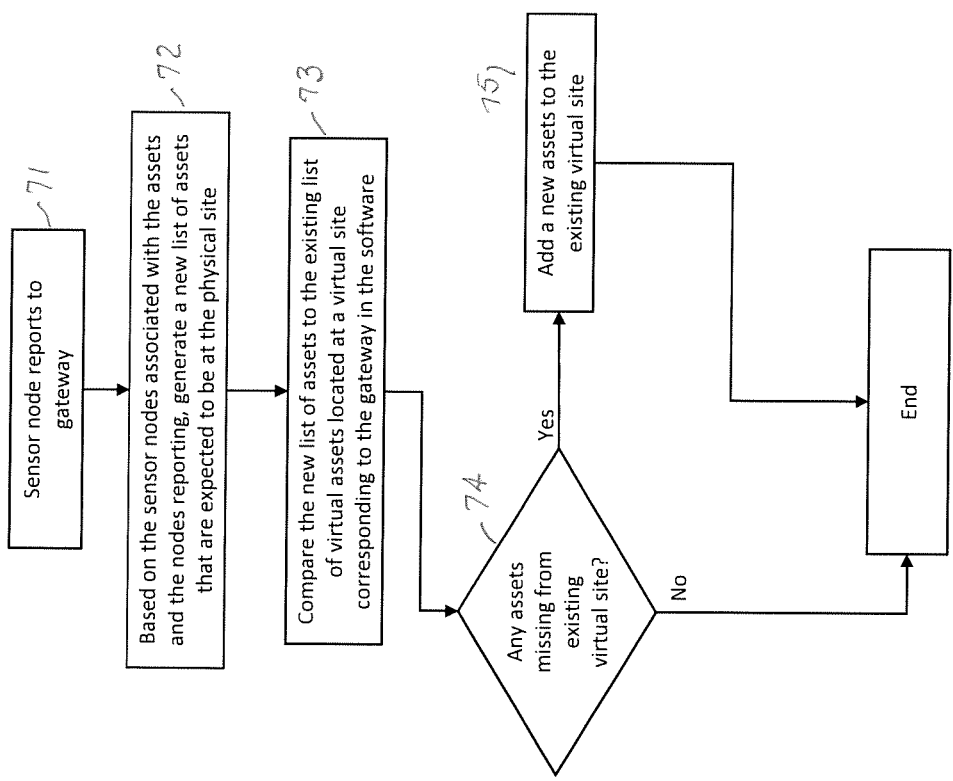
FIG. 7 shows the process used to add assets to a virtual site.

FIG. 7 shows the first of two process that run in combination on the gateway and remote server. The first process is the method of adding assets to a virtual site. The second process, shown in FIG. 8, is the process for removing assets from the virtual sites in the software organization structure.

The process shown in FIG. 7 process is triggered anytime a sensor reports to the gateway. At operation block 71, a sensor node reports via wireless communication to the gateway and the gateway receives data packet from a node Based on the sensor node that reported and its association with an asset, the list of assets on associated with the gateway is updated at operation block 72. The list is shared with the remote server at function block 73 and, based on the association of the gateway to a site, the difference between the new list and the existing list is identified at decision block 74. Any new assets that are not on the site list are immediately added to the virtual site in the software at function block 75.

Figure 8:
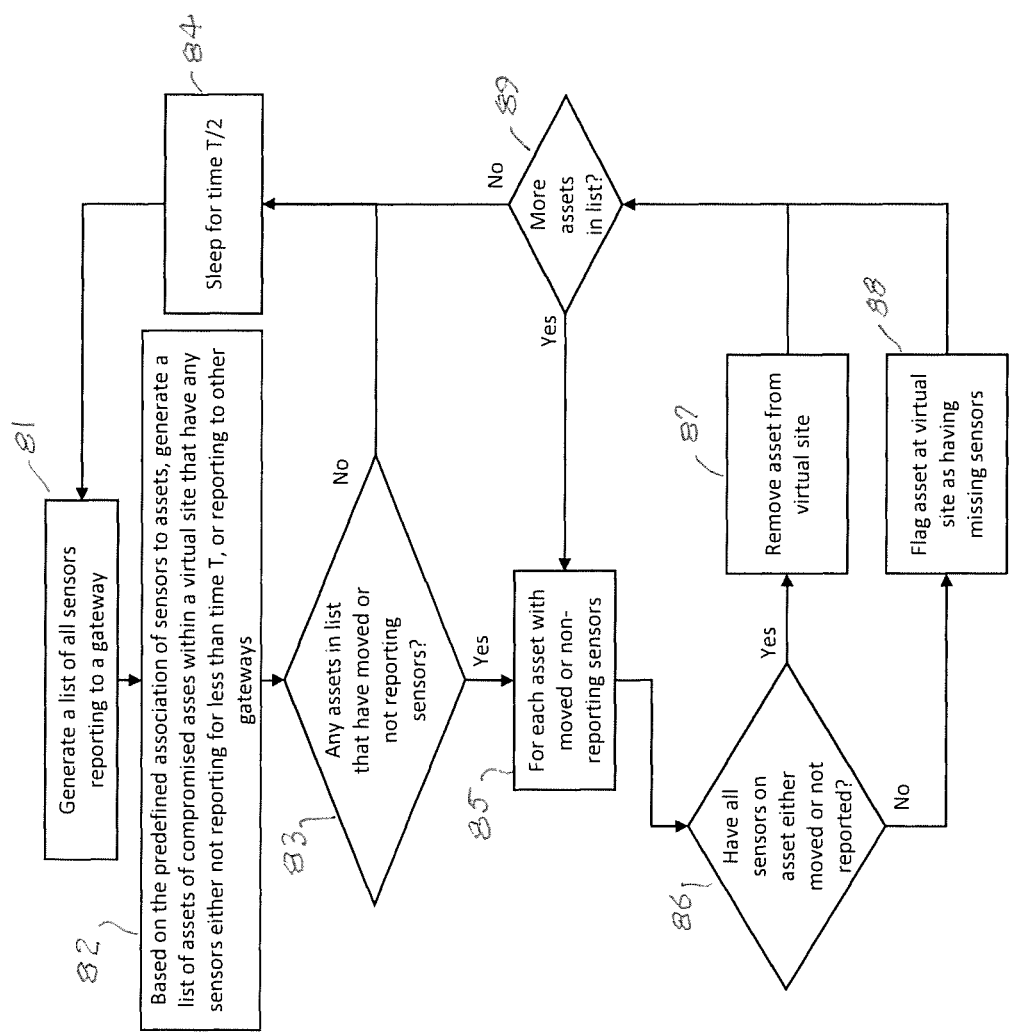
FIG. 8 shows the process used to remove assets from a virtual site in the software organization structure and flag sensors that are missing from assets.

The process shown in FIG. 8 is different than the FIG. 7 process in that it runs on a timed cycle rather than based on an event trigger. The process begins at operation block 81 where a list of all sensors reporting to a gateway is generated. Then in function block 82, based on the predefined association of sensors to assets, a list of compromised assets within a virtual site that have one or more sensors either not reporting for less than time T, or reporting to other gateways, is generated. If the list of compromised assets is empty as determined in decision block 83, then the process go back to sleep in operation block 84 for a period of T/2 and, upon waking, starts the process again. For each asset on the list of compromised assets output at function block 85, an evaluation is made at decision block 86 to determine if all of the sensors that are missing or if at least one still remains reporting to the gateway. If all sensors are not reporting for a given asset on the list of compromised assets, then that asset is removed from the virtual site at function block 87. For assets on the list of compromised assets with at least one sensor reporting, the asset is left in the virtual site but a missing sensor us flagged at function block 88 and report those in the software. This process is repeated until all assets in the list have been considered as determined in decision block 89, at which point go to sleep for a time period of T/2

Figure 9:
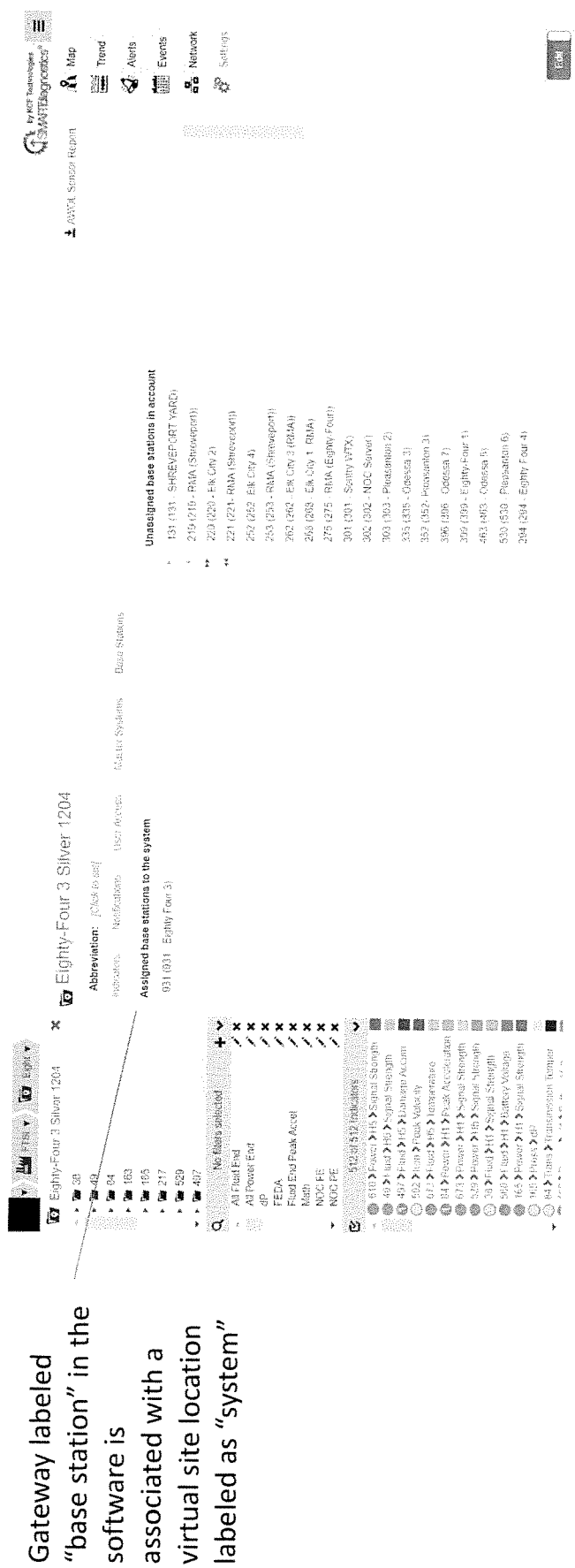
FIG. 9 shows a screenshot from the software where gateways are assigned to a virtual site location.

FIG. 9 shows a screenshot from the software in which the invention is implemented. The particular screen shown in FIG. 9 is the list where gateways that are assigned to a virtual site location.

Figure 10:
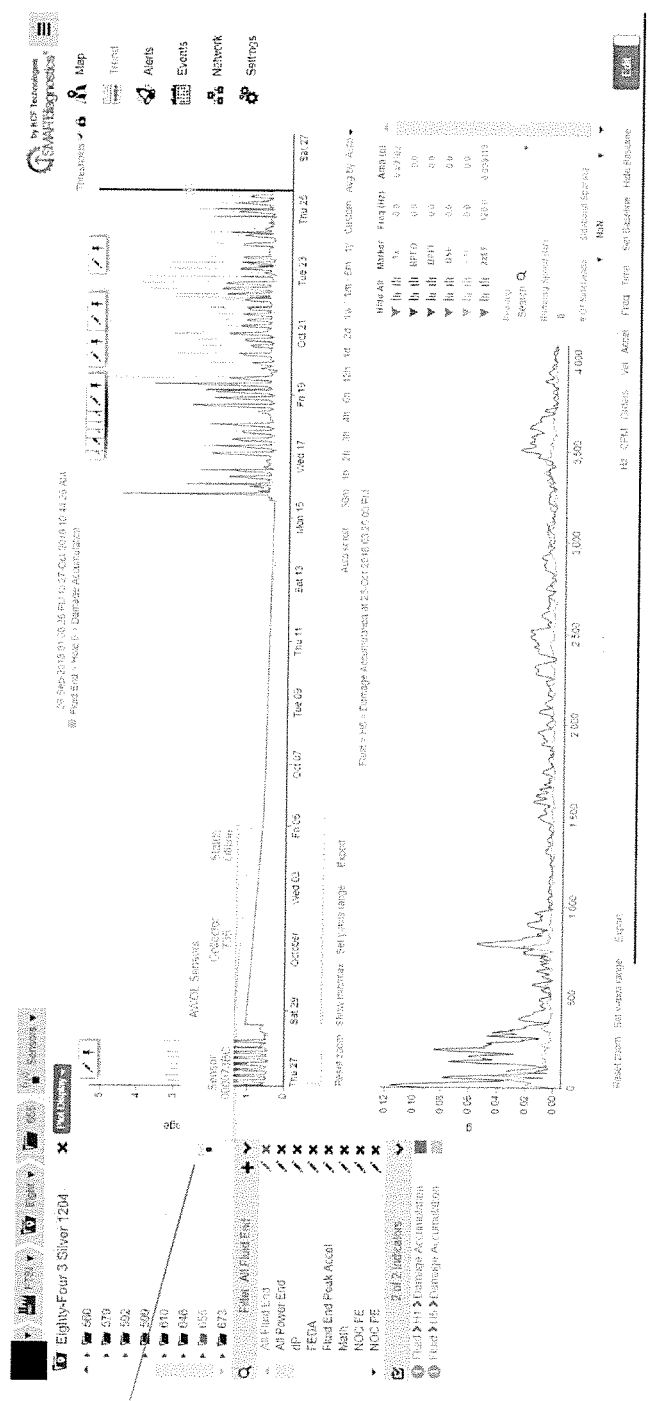
FIG. 10 shows a screenshot of the tool in software that is used to indicate sensors that are missing from an asset.

FIG. 10 shows a screenshot of the tool in software that is used to indicate sensors that are missing from an asset.

A virtual asset is a data folder, location in the software, or virtual data tagging that resides below a virtual site and has data associated with it that is generated by sensors attached to the actual physical asset. A virtual master site or system includes all assets that could be at any site or location and are part of a corporation or account. A data gateway is a physical device that receives data from one or more sensors via a wired or wireless connection and then loads that data into a remote or local database, and may be a receiver, set of receivers, or more generally the basis for a Local Area Network (LAN). A virtual software data hierarchy is a structure composed of one or more folders which may contain one or more subfolders. The hierarchy is a way to organize the user interface with data that is collected, managed, viewed, monitored, or analyzed.

Considering that sensors are typically magnetically mounted to assets, in practice one or more sensors are often misplaced or placed on the wrong asset. Considering this scenario and the method described in this invention, it is conceivable for the same virtual asset to be added to two different parts of the software hierarchy. To address this case, this invention includes a software provision that evaluates the status of all sensor nodes that are expected to be on that asset or associated with that asset. If any of those sensors are missing, meaning that they are not communicating with the local network, then the software shows those sensors as missing or disconnected. This feature also helps with certain other cases related to low cost wireless sensors like when their batteries become exhausted, damaged during asset maintenance, or removed or fall off an asset.

For example, if a sensor from one asset being mistakenly mounted on the wrong asset, and the asset shows in two places in the enterprise software, one of the two assets would show all sensors missing except the one sensor in question. The other asset would show all sensors present except the missing one. Based on this information the action needed to correct this would be obvious. This process is shown as one aspect of the flow diagram in FIG. 8.

Another specific case that this invention deals with is the removal of virtual assets from sites for assets that leave sites and are in transit, located in remote locations, or are at different sites. This process is also shown in FIG. 8. A similar scenario arises when the gateway is offline, or all sensors are offline. Generally, a virtual asset is removed from a virtual site in the software if all sensors associated with the asset are not in communication with the local network. However, the criteria for losing connection must accommodate conditions where sensor communication may not be ideal like during rain-fade. Rather than removing an asset from a site immediately in the software upon all sensors losing communication, a delay and/or network diagnosis can be performed. For example, if no fault diagnosis for communication loss is available and no communication has been received beyond a given time period, then the connection status can be considered broken and the asset is likely to no-longer be present at the site. Sensor communication used for such evaluation in this case may consist of various packet types including small pings or beacons to notify networks that the sensors exists and offer a way to receive commands from the gateway, health packets that carry data associated with sensor health, or full data packets that contain sensor measurements.

When an asset is offline, like while it is in transit or the local network is not operational, and the asset has therefore been removed from the virtual site location in the software, the historical data must be preserved and viewable at any time. This requirement is accommodated by using a master system site in the enterprise software where all assets and their full historical datasets reside regardless of their site status. In this way, the site locations in the software are redundant with the master site. While the data doesn't need to be replicated and occupy two places in the database, the structure for accessing that data can have several paths to the data, each represented by the location dependent sites and the master site.

While the invention has been described in terms of a single preferred embodiment, those skilled in the art will recognize that the invention can be practiced with modification within the spirit and scope of the appended claims.

The invention claimed is:

1. A system for data organization based on physical sensor data routing over a low power wireless network comprising:
   a variety of mobile assets;
   one or more wireless sensors attached to and associated with each said mobile asset;
   one or more receivers or transceivers receiving data from the wireless sensors;
   at least one gateway aggregating wireless sensor data from the one or more receivers or transceivers, wherein the one or more receivers or transceivers and the at least one gateway forming a local network associated with a given site; and
   at least one server hosting enterprise software receiving aggregated data from said at least one gateway, said enterprise software performing the steps of
   creating an association between a physical data gateway and a virtual site level data folder in a software data hierarchy,
   creating an association between one or more of said wireless sensors with a virtual asset level data folder in the software data hierarchy,
   upon connection of any one of an asset's sensors to a gateway, automatically adding the entire virtual asset, data history, and repository for ingesting data to the virtual site in the software hierarchy,
   only showing new data in a particular asset folder for sensors that are communicating to that particular gateway,
   upon disconnection of all of an asset's associated sensors from the site gateway, removing the virtual asset from the site but not deleting the virtual asset from a separate master hierarchy and retaining all historical data with the virtual asset in a master site, and
   upon disconnection of one or more asset sensors from the gateway but not all sensors on an asset, leaving the asset with the site and mark each of the disconnected sensors as disconnected.

2. The system for data organization based on physical sensor data routing over a low power wireless network recited in claim 1, wherein said enterprise software uses a connectivity status of each of said plurality of wireless sensors to evaluate a location of the asset to which the wireless sensors are affixed.

3. The system for data organization based on physical sensor data routing over a low power wireless network recited in claim 1, wherein the enterprise software uses the location of an asset to automatically update organization in a data hierarchy.

4. The system for data organization based on physical sensor data routing over a low power wireless network recited in claim 1, wherein the enterprise software identifies individual delinquent wireless sensors based on a status of any other wireless sensors affixed to an asset.

5. The system for data organization based on physical sensor data routing over a low power wireless network recited in claim 1, wherein the mobile assets are located at dynamically changing sites.

6. The system for data organization based on physical sensor data routing over a low power wireless network recited in claim 5, wherein the mobile assets are components of hydraulic fracturing trucks, the hydraulic fracturing trucks being connectable to a wellhead by means of a manifold.

7. The system for data organization based on physical sensor data routing over a low power wireless network recited in claim 6, further including wireless sensors attached to and associated with the wellhead and other assets at the wellhead location.

8. The system for data organization based on physical sensor data routing over a low power wireless network recited in claim 6, wherein the wireless sensors include pressure sensors, vibration sensors and temperature sensors, the pressure sensors measuring dynamic inlet and outlet pressure on piping connecting the hydraulic fracturing trucks to the manifold, and the vibration and temperature sensors measuring the health of bearings, valves and gears.

9. The system for data organization based on physical sensor data routing over a low power wireless network recited in claim 6, wherein said enterprise software performs the steps of
   only showing new data in a particular asset folder for sensors that are communicating to that particular site gateway,
   upon disconnection of all of an asset's associated sensors from the site gateway, removing the virtual asset from the site but not deleting the virtual asset from a separate master hierarchy and retaining all historical data with the virtual asset in a master site, and
   upon disconnection of one or more asset sensors from the gateway but not all sensors on an asset, leaving the asset with the site and mark each of the disconnected sensors as disconnected.

10. The system for data organization based on physical sensor data routing over a low power wireless network recited in claim 1, wherein each of said sensors comprise:
    a sensor transducer generating an analog signal as a measure of sensed condition;
    a data acquisition module which receives the analog signal and converts the analog signal to a digital representation of the analog signal;

a wireless transceiver which receives the digital representation and transmits it to the gateway; and a microcontroller connected to and controlling the operations of the data acquisition module and the wireless transceiver.

11. The system for data organization based on physical sensor data routing over a low power wireless network recited in claim 10, wherein the at least one gateway comprises:

a first wireless transceiver for receiving transmissions from said plurality of wireless sensors;

a second wireless transceiver for communicating with said at least one server; and a computer which receives a list of reporting sensors from said first transceiver and a sensor-to-asset association from said at least one server via said second transceiver, the computer generating a list of assets on a physical site based on sensors reporting and their asset associations and comparing this list with a list of assets previously known to be on a virtual site to produce an output of new or missing assets at the physical site, the computer reporting assets that are present but not on the list and assets that are not present but on the list back to said at least one server via said second transceiver.

12. The A system for data organization based on physical sensor data routing over a low power wireless network comprising:

a variety of mobile assets;

one or more wireless sensors attached to and associated with each said mobile asset;

one or more receivers or transceivers receiving data from the wireless sensors;

at least one gateway aggregating wireless sensor data from the one or more receivers or transceivers, wherein the one or more receivers or transceivers and the at least one gateway forming a local network associated with a given site; and at least one server hosting enterprise software receiving aggregated data from said at least one gateway, said enterprise software performing the steps of creating an association between a physical data gateway and a virtual site level data folder in a software data hierarchy, creating an association between one or more of said wireless sensors with a virtual asset level data folder in the software data hierarchy, and upon connection of any one of an asset's sensors to a gateway, automatically adding the entire virtual asset, data history, and repository for ingesting data to the virtual site in the software hierarchy, wherein the at least one gateway comprises:

a first wireless transceiver for receiving transmissions from said plurality of sensors;

a second wireless transceiver for communicating with said at least one server; and a computer which receives a list of reporting sensors from said first transceiver and a sensor-to-asset association from said at least one server via said second transceiver, the computer generating a list of assets on a physical site based on sensors reporting and their asset associations and comparing this list with a list of assets previously known to be on a virtual site to produce an output of new or missing assets at the physical site, the computer reporting assets that are present but not on the list and assets that are not present but on the list back to said at least one server via said second transceiver.

* * * * *